United States Patent
Leyva et al.

(10) Patent No.: US 12,052,637 B2
(45) Date of Patent: *Jul. 30, 2024

(54) TRACKING DEVICE LOCATION AND COORDINATION

(71) Applicant: Tile, Inc., San Mateo, CA (US)

(72) Inventors: Omar Leyva, Irvine, CA (US); Christopher Brooks, Milwaukie, OR (US); Steven R. Klinkner, Palo Alto, CA (US); Cihang Yang, Foster City, CA (US); Eric Chiquillo, Elk Grove, CA (US); Andre Gatti, San Francisco, CA (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,262

(22) Filed: May 15, 2023

(65) Prior Publication Data

US 2023/0283992 A1  Sep. 7, 2023

Related U.S. Application Data

(63) Continuation of application No. 17/399,069, filed on Aug. 11, 2021, now Pat. No. 11,689,891.

(51) Int. Cl.
| | |
|---|---|
| *H04W 4/029* | (2018.01) |
| *H04M 1/2755* | (2006.01) |
| *H04M 1/72445* | (2021.01) |
| *H04M 3/42* | (2006.01) |
| *H04W 12/02* | (2009.01) |

(52) U.S. Cl.
CPC ......... *H04W 4/029* (2018.02); *H04M 1/2755* (2013.01); *H04M 1/72445* (2021.01); *H04M 3/42008* (2013.01); *H04W 12/02* (2013.01)

(58) Field of Classification Search
CPC ... H04W 4/029; H04W 12/02; H04M 1/2755; H04M 1/72445; H04M 1/72457; H04M 3/42008; H04L 67/02; H04L 67/1396; H04L 67/535; H04L 67/75
See application file for complete search history.

(56) References Cited

U.S. PATENT DOCUMENTS

| | | | |
|---|---|---|---|
| 9,848,299 B1 * | 12/2017 | Kumar | H04W 12/126 |
| 10,008,097 B1 | 6/2018 | Kumar et al. | |
| 2005/0035860 A1 * | 2/2005 | Taylor | G06K 17/0022 340/572.1 |
| 2009/0013060 A1 | 1/2009 | St Marie | |

(Continued)

*Primary Examiner* — Farid Seyedvosoghi
(74) *Attorney, Agent, or Firm* — Fenwick & West LLP

(57) ABSTRACT

Communication between an owner of a lost tracking device and a finder of a lost tracking device is established. A tracking system receives an identifier of a tracking device and a request for a web page from a mobile device that has captured an image of a smart code on the tracking device. The smart code is embedded with a URL to the web page. The system displays the web page on the mobile device and prompts the user to provide a location of the mobile device. The location is associated with the identifier of the tracking device. A notification indicating the location of the tracking device is generated for the owner. The owner is prompted to provide information to establish contact with the finder of the device, and the web page is populated with the owner's provided information for display on the finder's mobile device.

18 Claims, 10 Drawing Sheets

(56) References Cited

U.S. PATENT DOCUMENTS

| | | |
|---|---|---|
| 2010/0261450 A1* | 10/2010 | Martin-Cocher .......................... G06Q 30/0603 455/556.1 |
| 2017/0064511 A1 | 3/2017 | McCormick |
| 2017/0142551 A1 | 5/2017 | Chapiewski et al. |
| 2018/0014250 A1 | 1/2018 | de Barros Chapiewski |
| 2018/0241489 A1* | 8/2018 | Daoura ................... H04L 67/10 |
| 2019/0103012 A1 | 4/2019 | Daoura et al. |

\* cited by examiner

TRACKING DEVICE LOCATION AND COORDINATION

CROSS REFERENCE TO RELATED APPLICATIONS

This application is a continuation of U.S. application Ser. No. 17/399,069, filed Aug. 11, 2021, now U.S. Pat. No. 11,689,891, which is incorporated by reference in its entirety.

BACKGROUND

This disclosure relates generally to tracking devices, and more specifically, to enabling the retrieval of lost tracking devices.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost).

However, traditional tracking devices and corresponding systems suffer from one or more disadvantages. For instance, if someone locates a lost tracking device, the opportunities to return the lost tracking device to the owner are limited. Further, the finder of the tracking device is often unknown to the owner of the tracking device. Thus, it is important to protect the privacy of the owner of the tracking device when enabling the finder of the tracking device to contact the owner.

SUMMARY

A system and method for establishing communication between an owner of a tracking device and a finder of a lost tracking device is described. The tracking device is printed, engraved, stickered, etched, or otherwise marked with a smart code. The smart code may be a QR code, bar code, or image. Upon finding a tracking device, the finder of the device can scan, with a mobile device, the smart code on the tracking device to contact the owner. The finder of the tracking device is not required to have a specific application corresponding to the tracking device in order to scan the tracking device and contact the owner.

A tracking system is configured to track and manage tracking devices. The tracking system additionally establishes contact between the owner of a device and the finder. When a finder scans the smart code of the tracking device, the tracking system receives an identifier of the tracking device as well as a request for a web page to be provided to the mobile device that scanned or captured an image of the smart code. The URL of the web page is embedded or otherwise encoded in the smart code. The tracking system provides the web page for display on the mobile device of the finder and prompts the mobile device for it's location. The location of the mobile device of the finder is used as a proxy for the last known location of the tracking device, and the tracking system associates the location of the mobile device with the identifier of the tracking device.

The tracking system generates a notification on the mobile device of the owner. The notification indicates that the tracking device has been found and includes the location provided by the finder. Before or after the tracking device is scanned, the tracking system receives information from the owner of the tracking device. The information may comprise contact information of the owner for a finder of the tracking device to contact the owner. The information may also comprise privacy settings selected by the owner indicating a preference for a method of contact such as call, text, email, or anonymous communication. The tracking system populates the web page with the information from the owner and displays the web page on the mobile device of the finder, enabling the finder to contact the owner.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Environment Overview

Embodiments described herein detail functionality associated with a tracking device. A user can attach a tracking device to or enclose the tracking device within an object, such as a wallet, keys, a car, a bike, a pet, or any other object that the user wants to track. The user can then use a mobile device (e.g., by way of a software application installed on the mobile device) or other device or service to track the tracking device and corresponding object. For example, the mobile device can perform a local search for a tracking device attached to a near-by object. However, in situations where the user is unable to locate the tracking device using their own mobile device (e.g., if the tracking device is beyond a distance within which the mobile device and the tracking device can communicate), the user can leverage the capabilities of a community of users of a tracking device system.

In particular, a tracking system (also referred to herein as a "cloud server" or simply "server") can maintain user profiles associated with a plurality of users of the tracking device system. The tracking system can associate each user within the system with one or more tracking devices associated the user (e.g., tracking devices that the user has purchased and is using to track objects owned by the user). If the user's object becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device.

Figure 1:
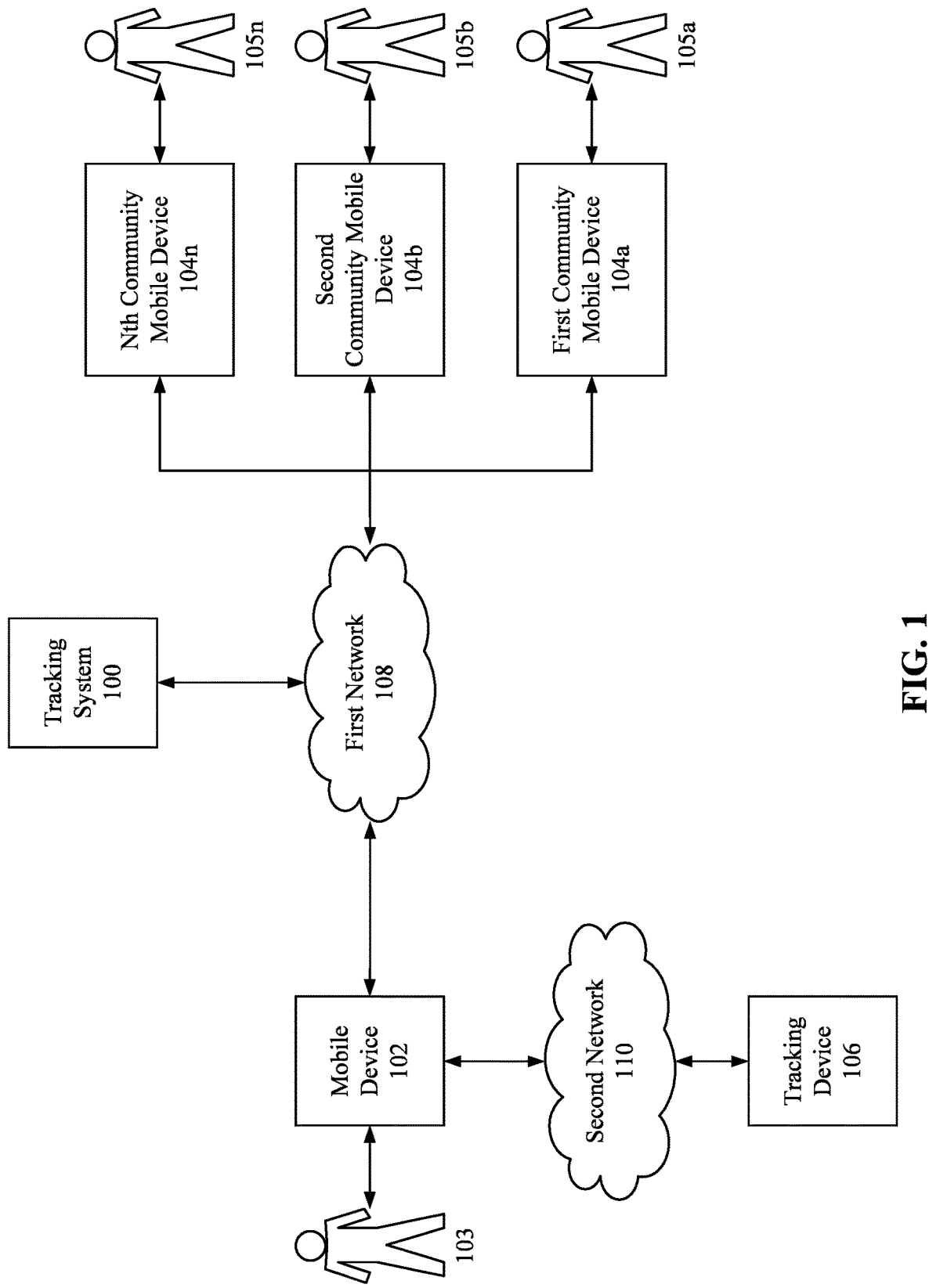
FIG. 1 illustrates an example tracking system environment in which a tracking device can operate, according to one embodiment.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent).

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
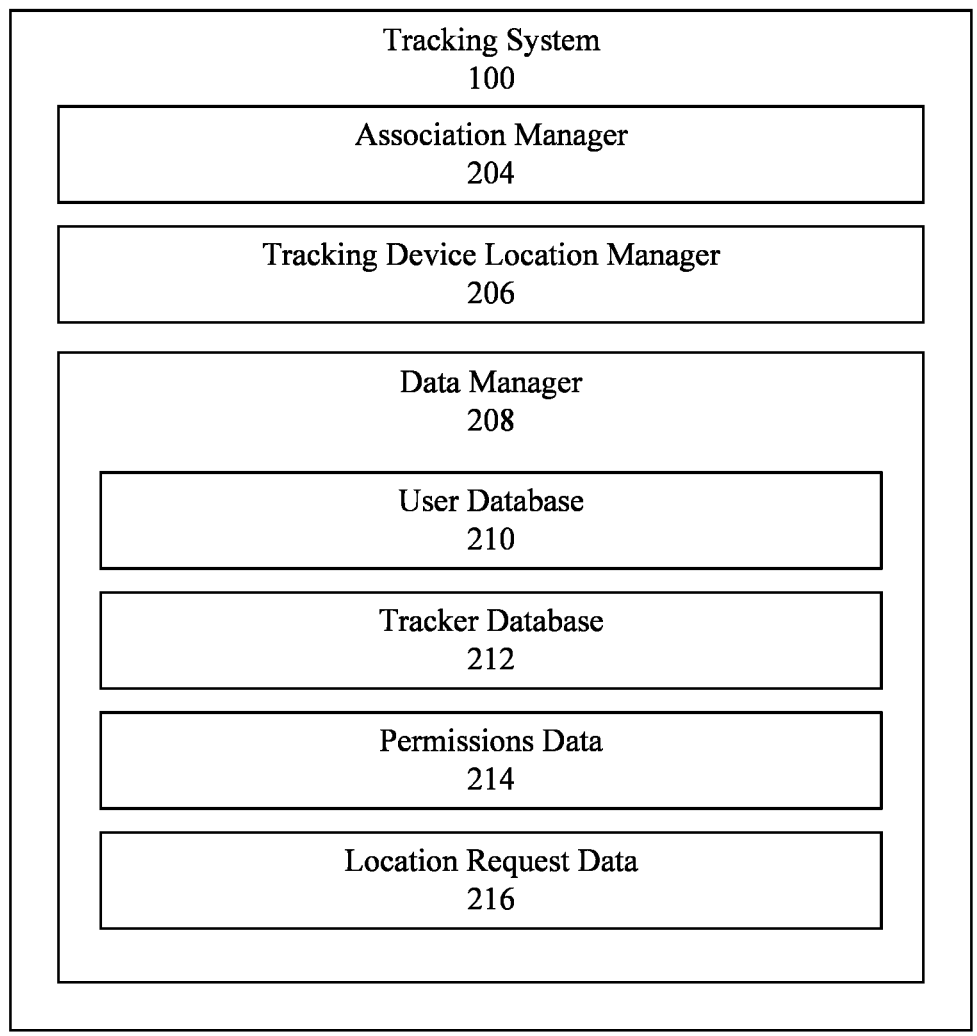
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

In some embodiments, permissions data 214 includes user-specified privacy controls that control how the tracking system 100 facilitates communication between users_. For example, the tracking system 100 may restrict how much information is shared between users. Privacy controls can be selected by the user 103 via the mobile device 102 or another device from which the user 103 can interact with the tracking system 100. In embodiments where the user 103 has more than one tracking device 10, the privacy controls can be specified for all, a subset, or one of their tracking devices 106. Privacy controls are discussed in further detail with respect to FIG. 6.

Figure 3:
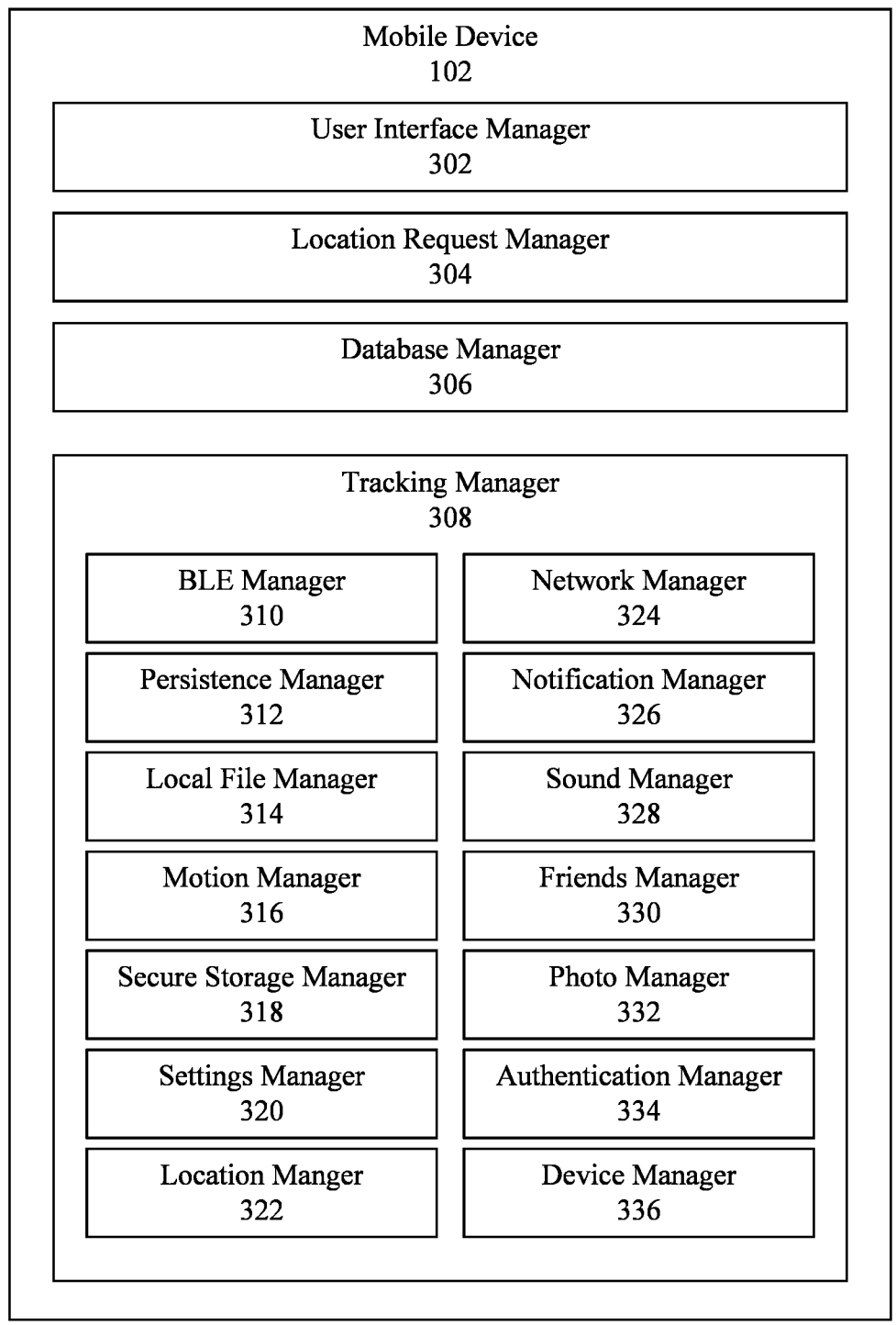
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable from the mobile device 102 via the user interface manager 302, and the location request manager 304 may process the lost indication and provide any necessary data to the tracking system 100 for processing and relaying a location request to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
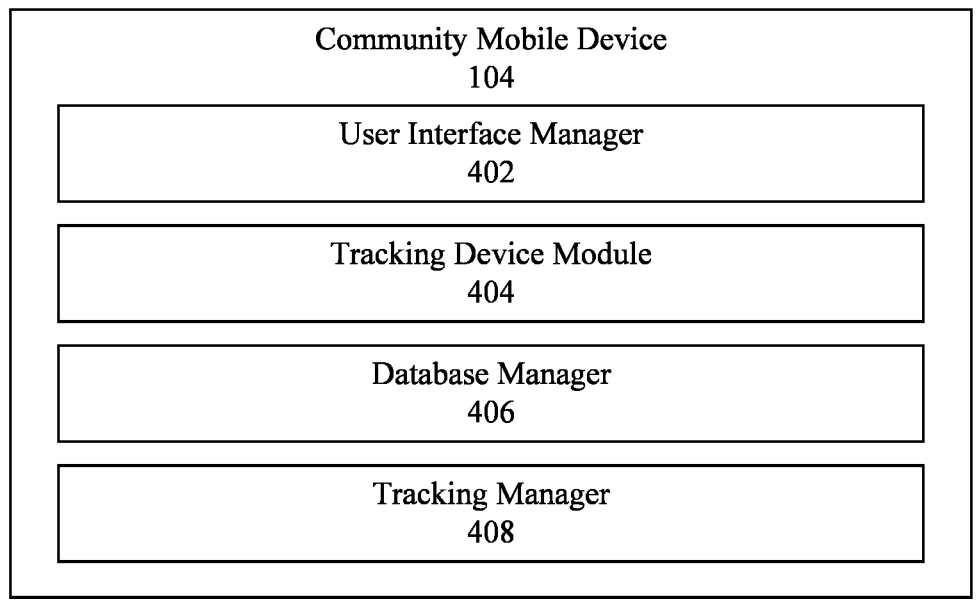
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
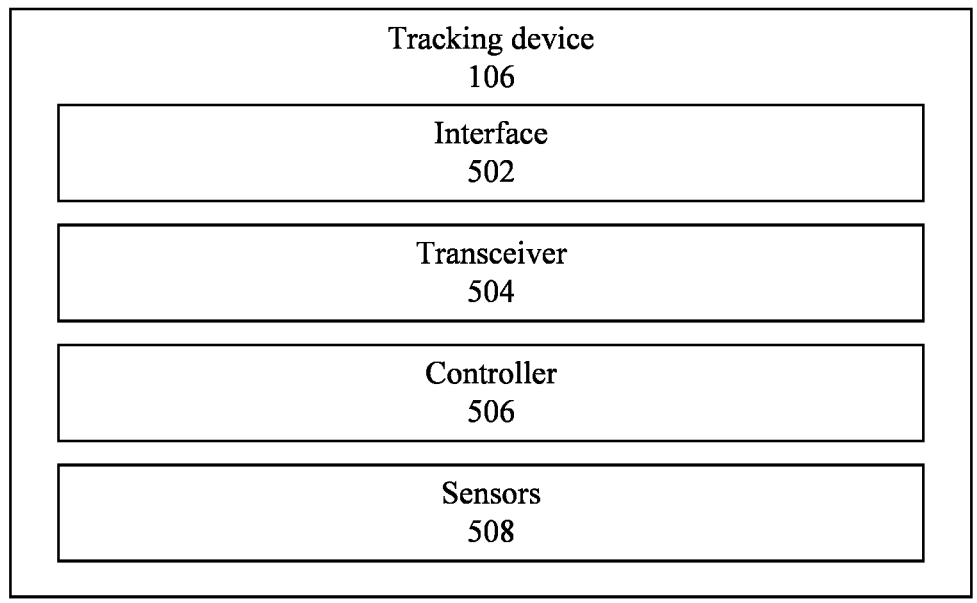
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, and one or more sensors 508. The transceiver 504 is a hardware circuit capable of both transmitting and receiving signals. It should be noted that in other embodiments, the tracking device 106 includes fewer, additional, or different components than those illustrated in FIG. 5.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508, or based on any other suitable criteria.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506.

Communication Privacy Controls

In some embodiments, the tracking system 100 facilitates communication between two users of the tracking system 100 based on user-specified privacy controls. Such communication can be helpful when a user 103 (the "owner") is trying to retrieve a lost tracking device 106 from a community user 105 (the "finder") that found the tracking device 106. However, users may be uncomfortable sharing personal information or communicating via particular mediums with other users that they do not know personally. In order to maintain user privacy, the tracking system 100 allows users to customize the privacy controls such that they can limit communications with other users to mediums and settings with which they are comfortable.

Figure 6:
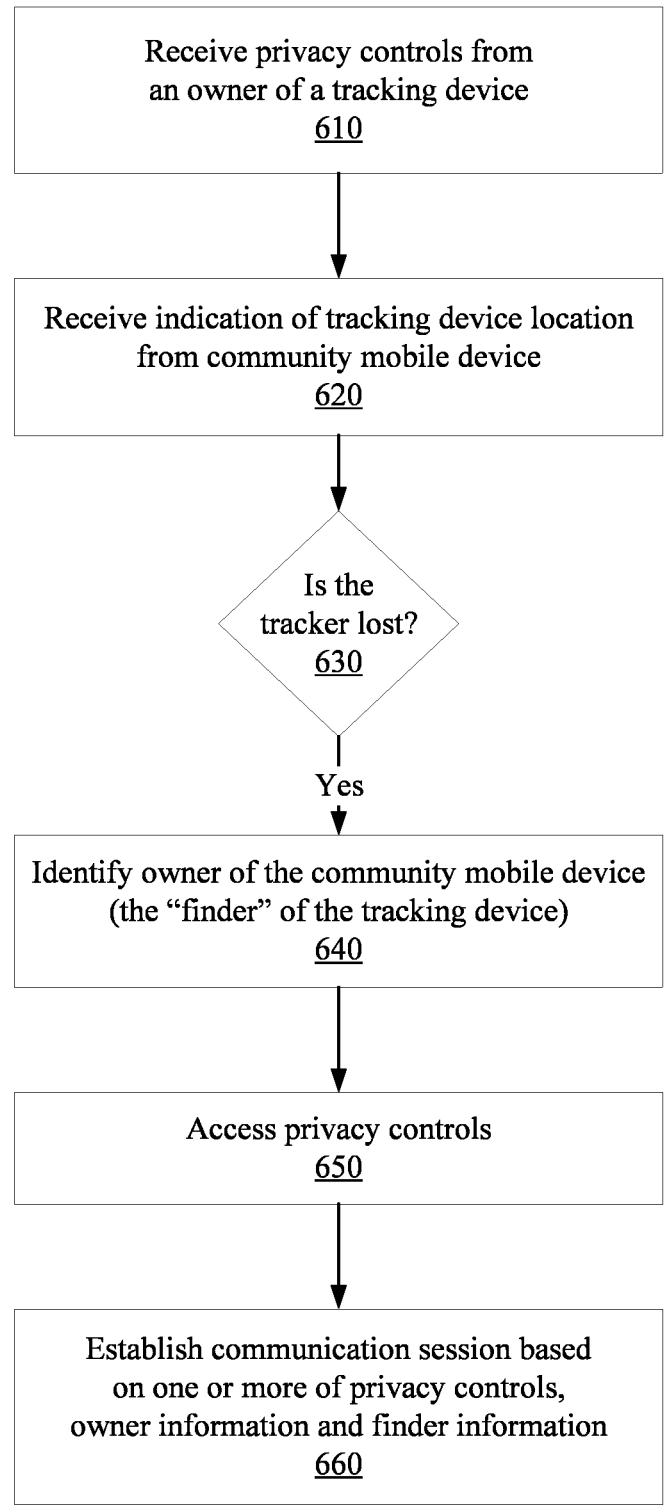
FIG. 6 illustrates a process for facilitating communication between a finder and an owner of a lost tracking device based on privacy controls in a tracking system environment, according to one embodiment.

FIG. 6 illustrates a method 600 for facilitating communication between the owner 103 and the finder 105 of a lost tracking device 106 based on privacy controls, according to one embodiment. The tracking system 100 receives 610 privacy controls from the owner 103 of the tracking device 106. These privacy controls are made up of permitted communication settings that dictate how communications sessions between the owner 103 and the finder 105 are established and what information is shared during the communication sessions. The owner 103 may set their privacy controls generally, or according to characteristics of the tracking device 106 and/or the finder 105.

Characteristics of the tracking device 106 may include the specific object or the object category to which the tracking device 106 is coupled (i.e., attached to) and the location of the tracking device 106. For example, the owner 103 may be willing to share more information (e.g., the owner's 103 cell phone number) to expedite retrieval if the object to which the tracking device 106 is coupled is valuable (e.g., a laptop). The owner 103 may specify that a particular type of communication session can be established or particular information can be shared based on the characteristics of the tracking device 106. For example, if the tracking device 106 is found within the hometown of the owner 103, the owner 103 may specify that the finder 105 can contact the owner 103 by phone, or may share the email address of the owner 103 with the finder 105.

Characteristics of the finder 105 may include the location of the finder 105 (current location, historical location, or location relative to the tracking device 106, the owner 103, or a particular location), reputation of the finder 105, and verification status of the finder 105. The reputation or verification status of the finder 105 can indicate trustworthiness as measured by the tracking system 100 and/or other community users 105, which may increase the willingness of the owner 103 to share information. Reputation can be determined based on a rating sourced from community users 105 based on the interactions of the finder 105 with our community members or based on the finder's 105 history of interacting with or returning lost tracking devices 106. Similarly, the tracking system 100 may keep track of the finder's 105 history of returning lost tracking devices 106 and can provide a reputation rating based on this history. The tracking system 100 may "verify" the identity of the finder 105 by independently confirming some of the personal information of the finder 105. For example, the tracking system 100 may request a copy of the finder's 105 driver's license and can confirm the finder's 105 name, address, and driver's license number through a third-party database.

The privacy controls may specify what identifying information (if any) is shared with the finder 105. For example, the communications may be completely anonymous, the owner's 103 identify within the tracking system 100 (e.g., username) may be shared with the finder 105, or the owner's 103 true identity (e.g., real name) may be shared with the finder 105. The privacy controls may also specify whether communication sessions take place through the tracking system 100 (e.g., within a tracking application of the tracking system 100 running on the mobile device 102 and community mobile device 104) or external to the tracking system 100 (e.g., external text or SMS messages, by phone, by email, etc.), and what type of communication session (e.g., chat, text, audio, video) is initiated. Communication sessions are discussed in further detail in conjunction with step 660 below.

In some embodiments, the tracking system 100 receives 610 the privacy controls during a tracking device setup process. However, in other embodiments, the owner 103 may not specify (and thus the tracking system 100 does not receive 610) privacy controls until they are needed. In such cases, the tracking system 100 may prompt the owner 103 of the tracking device 106 to provide privacy controls after steps 630 or 640 described below. Alternatively or additionally, the tracking system 100 receives 610 privacy controls from the finder 105 in the ways described above with respect to the owner 103, or relies upon default privacy controls (e.g., privacy controls established by the tracking system 100 to protect a user's information and identity).

As discussed in conjunction with the community mobile device 104 of FIG. 4, the tracking system 100 regularly receives updates regarding the location of the tracking device 106. However, receipt 620 of a communication updating the location of the tracking device 106 from a user device (such as a community mobile device 104) that has not previously been associated with the tracking device 106 can be an indication that the tracking device 106 is lost. On the other hand, a community user 105 may have just passed by the tracking device 106 when it wasn't lost. Because of this, the tracking system 100 may need to determine 630 if the tracking device 106 is lost.

The tracking system 100 can determine 630 if the tracking device 106 is lost in a number of different ways. The tracking system 100 may rely on flags that it maintains for the tracking device 106. For example, the tracking device 106 may be considered "lost" only if it has been flagged as lost by its owner 103 and/or by the tracking system 100. The tracking system 100 can also query the owner 103 of the tracking device 106 to determine 630 if it is lost. The query can rely on a passive or active response from the owner 103 of the tracking device 106. A query requiring a passive response may only require a response from the owner 103 if the tracking device is actually lost. For example, the tracking system 100 may send a notification to the owner 103 stating that the tracking device 106 has been found at a particular location by a community user 105 with the option to classify the tracking device as lost or to simply ignore the notification. A query requiring an active response may prompt the owner 103 to explicitly indicate whether the tracking device 106 is lost or not lost. For example, the tracking system 100 may send the owner 103 a persistent notification asking "Is your tracking device lost?" that cannot be dismissed until the owner 103 has indicated "yes" or "no." Alternatively, in some embodiments the tracking system 100 does not take explicit steps to determine 630 if the tracking device 106 is lost and instead proceeds assuming that any tracking device 106 that has its location reported by a community user 105 is lost until otherwise indicated by the owner 103.

Once the tracking system 100 has determined 630 that the tracking device 106 is lost, it identifies 640 the community user 105 associated with the community mobile device 104 (the "finder" of the lost tracking device 106). The tracking system 100 may identify the finder 105 by matching identification information provided by the community mobile device 104 to identification information stored for the finder 105 by the tracking system 100.

To facilitate communication between the owner 103 and the finder 105, the tracking system 100 accesses 650 the privacy controls of the owner 103 and the finder 105 and then establishes 660 a communication session between the owner 103 and the finder 105 based on the accessed 650 privacy controls, owner information, and/or finder information. Information about the owner 103 and/or the finder 105 includes the characteristics of the tracking device 106 and the finder 105 (and/or the owner 103 in embodiments where the finder 105 has specified privacy controls) discussed in conjunction with step 610. The tracking system 100 may establish 660 the communication session, for instance in one or more of the methods described below. In embodiments where both the owner 103 and the finder 105 have specified conflicting privacy controls, the tracking system 100 may opt to use the most restrictive privacy controls between the owner 103 and the finder 105, or a hybrid of the most restrictive privacy control settings to establish 660 the communication session.

The relative location between the owner 103, finder 105, and/or tracking device 106 may be used to determine if a communication session is established 660. For example, the communication session may only be established 660 or a more direct line of communication may be provided (e.g., a call as opposed to a chat session) if the finder 105 is within a particular radius of the tracking device 106, or if the owner 103 and the finder 105 are within a particular radius of a drop-off location.

The tracking system 100 may directly establish 660 the communication session within the tracking system 100 (e.g., through a tracking application of the tracking system 100 running on a mobile device 102 and/or a community mobile device 104). The communication session may be location-, text-, audio-, or video-based. In a location-based communication session, the finder 105 may authorize the tracking system 100 to provide the owner 103 with the current location of the owner 103 or a location associated with the owner 103 (such as the owner's 103 home, place of work, school, specified drop-off location, and the like). A text-based communication session may be a chat room or text messaging environment in which the owner 103 and the finder 105 can exchange messages, for instance anonymously, through a tracking application associated with the tracking system 100, or through an external instant message or SMS application. An audio- or video-based communication session can take the form of a direct call between the owner 103 and the finder 105 through the tracking system 100, or an exchange of audio- or video-messages.

Additionally, the tracking system 100 may establish 660 a communication session that only allows limited structured interactions between the owner 103 and the finder 105. For example, the tracking system 100 can establish a communication session between the owner 103 and the finder 105 that only lets them schedule a date, time, and location for a drop-off or exchange for the tracking device 106 through various prompts. In some embodiments, the users may only select between predetermined drop-off/exchange locations. These predetermined locations may be public spaces like police stations, post offices, lost and found stations (e.g., at a mall or theme park), or coffee shops.

In some embodiments, the tracking system 100 indirectly establishes 660 a communication session between the owner 103 and the finder 105 by providing one or both of them with contact information. Contact information may include phone number, email, and/or address. For example, the owner 103 may authorize the tracking system 100 to provide their address to the finder 105 so that the finder 105 can ship the tracking device 106 (and item it is tracking) back to the owner 103. Alternatively, the tracking system 100 may provide the owner 103 and the finder 105 with a phone number that they can communicate over (via call or text message) anonymously outside of the tracking system 100.

In one embodiment, the tracking system 100 sets up a payment channel between the owner 105 and the finder 103 in addition to establishing 660 the communication session. The payment channel may be used to reward the finder 105 and/or reimburse the finder 105 for shipping costs of returning the tracking device 106 (and the corresponding item). As noted above, the types of information shared, the type of communication session established, and the communication restrictions specified by the privacy controls can be subject to one or more conditions specified by the privacy controls being satisfied (for instance, the location of the finder 105 relative to the tracking device 106, the reputation of the finder, the reputation of the owner 103, and the like).

"Lost" Operating Mode

In some embodiments, people who are not in communication with or otherwise associated with the tracking system 100 (e.g., non-users of the tracking system 100) can aid in the retrieval of a lost tracking device 106. Specifically, a non-user may be able to activate a "lost" operating mode that increases the likelihood of the tracking device 106 being found without communicating with the tracking system 100 directly.

Figure 7:
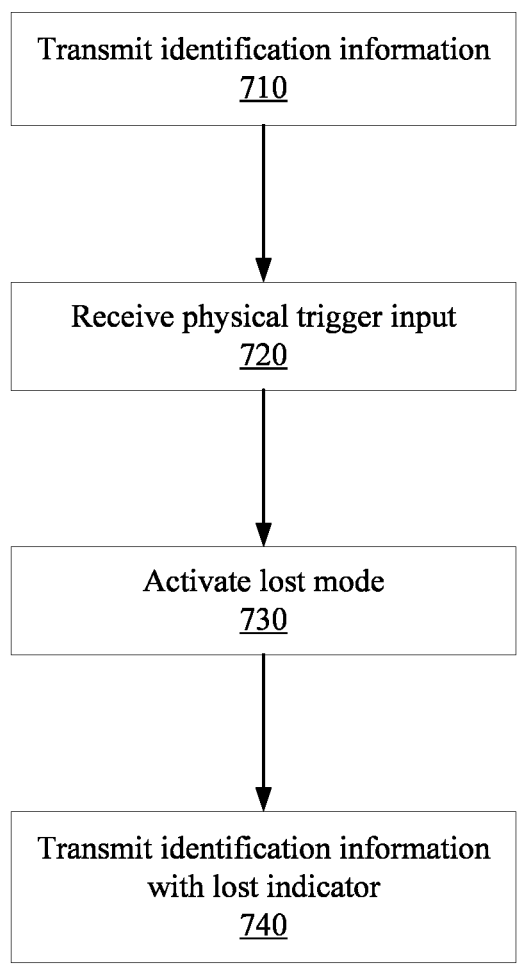
FIG. 7 illustrates a method for configuring a tracking device in a lost mode in a tracking system environment, according to one embodiment.

FIG. 7 illustrates a process for activating a "lost" mode of the tracking device 106 using a physical trigger, according to one embodiment. During normal operation, the tracking device 106 transmits 710 identification information to community mobile devices 104 that are within its reach (as discussed in conjunction with the tracking device 106 in FIG. 1). A community device 104 receives a beacon signal from the tracking device 106 and then relays the identification information of the tracking device 106 to the tracking system 100. Thus, the tracking system 100 is updated with the location of the tracking device 106. However, only community users 105 with community mobile devices 104 can aid in this manner. People who do not use the tracking system 100 (or even community users 105 who are not using their community mobile devices 104) may see a lost tracking device 106, but are unable to notify the tracking system 100 that the tracking device 106 is lost because they are not able to communicate with the tracking system.

In such a situation, a tracking device 106 may be able to receive 720 a physical trigger input that indicates to the tracking device 106 that it is lost. The physical trigger input can be used by non-users and users of the tracking system 100 alike because it only requires interaction with the tracking device 106 itself and not with the tracking system 100. The physical trigger input may be a physical button or switch. Some tracking devices 106 may only have a single physical button that is multifunctional based on the type of activation it receives. In those embodiments, a specific pattern and/or length of a button press can indicate that the tracking device 106 is lost. For example, a user could hold a button of the tracking device 106 for an extended period (e.g., three or ten seconds) or press the button a certain number of times (e.g., two) to indicate that the tracking device 106 is lost.

In response to receiving 720 the physical trigger input, the tracking device 106 activates 760 or configures itself to operate in a "lost" operating mode ("lost mode") that enhances its chances of being "found" by a passing community mobile device 104. When configured to operate in the lost mode, the tracking device 106 can adapt its operation to increase its chances of being found. This can include increasing the duty cycle of communications, the range of communications, and/or the strength of its beacon signals. For example, the tracking device could broadcast Bluetooth advertisement signals more frequently when the tracking device 106 is configured to operate in the lost mode than when the tracking device 106 is configured to operate in the normal mode. Additionally, or alternatively, when the tracking device 106 is configured to operate in the lost mode, the tracking device 105 can activate GPS, GSM, or other otherwise power-hungry component, for instance to self-report its location to the tracking system 100.

Additionally, in some embodiments, a tracking device 106 configured to operate in the lost mode includes a lost status indicator when transmitting 740 identification information to the tracking system 100 in order to notify the tracking system 100 that it is lost. The tracking system 100 may respond to the lost indicator by flagging within the tracking system 100 the tracking device 106 as lost. In some embodiments, in response to receiving a lost indicator, the tracking system 100 notifies the owner 103 of the tracking device 106 that tracking device 106 was configured to operate in the lost mode. In some embodiments, in response to receiving a lost indicator, the tracking system 100 notifies community users 105 that the tracking device 106 is lost so that it can be returned to the owner 103. For example, the tracking system 100 may notify treasure hunters or users with high reputations that reliably return lost tracking devices 106.

Figure 8:
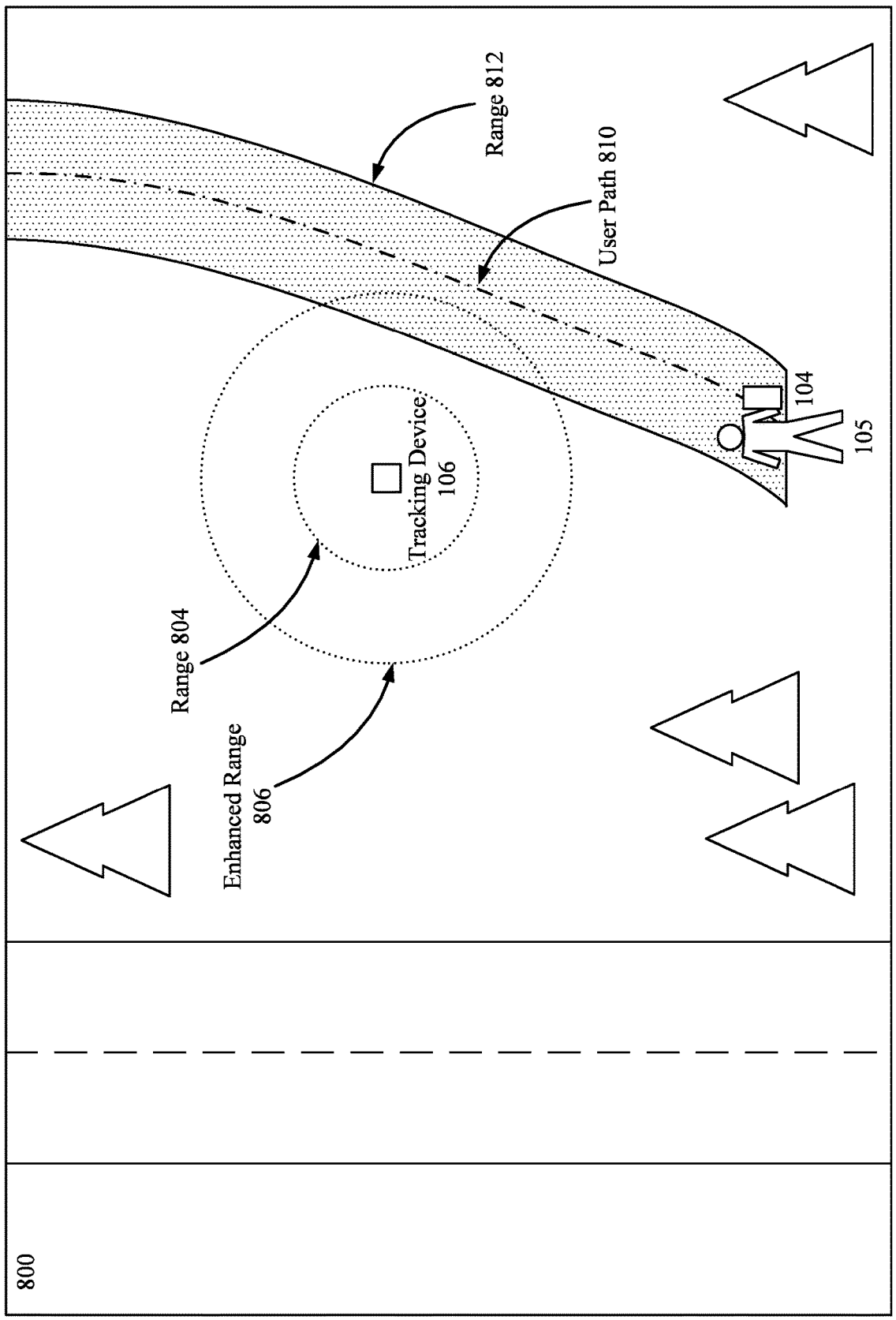
FIG. 8 illustrates an example lost tracking device environment, according to one embodiment.

FIG. 8 illustrates an example lost tracking device environment 800, according to one embodiment. The tracking device 106 emits beacon signals with range 804. These beacon signals may transmit 710 identification information or transmit 740 identification information and a lost indicator if the tracking device 106 is configured to operate in the lost mode, as discussed above. A tracking device 106 configured to operate in the lost mode may be able to extend its range 804 to enhanced range 806 so that its beacon signals are transmitted further than when the tracking device 106 is configured to operate in the normal mode. A community user 105 with community mobile device 104 associated with the tracking system 100 travels along a user path 810, and an associated community mobile device 104 is able to receive beacon signals within range 812. In this example, the user device 104 is only able to detect the tracking device 106 when it is emitting beacon signals with enhanced range 806 (i.e., when it is configured to operate in the lost mode) because enhanced range 806 overlaps with range 812 of the user device 104, while range 804 does not.

Tracking Device Code Images and Owner Coordination

Figure 9:
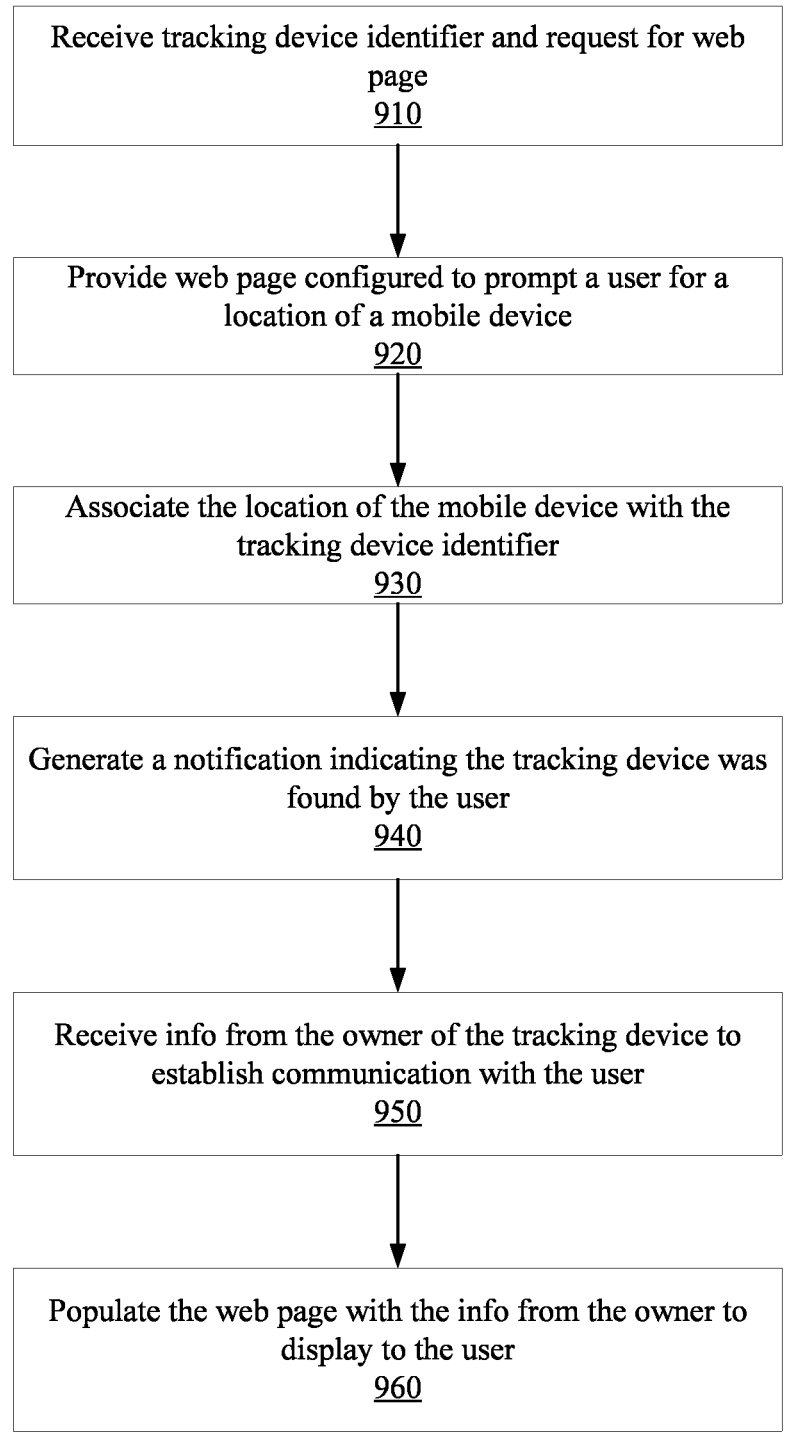
FIG. 9 illustrates a method for establishing communication between a finder of a tracking device and the owner of the tracking device, according to one embodiment.

FIG. 9 illustrates a method 900 for establishing communication between a finder of a tracking device and the owner of the tracking device, according to one embodiment. In the event that a tracking device is found by someone other than the owner of the device, the finder of the device can communicate with the owner to help the owner find their tracking device. In this situation, the privacy of both the owner and the finder must be protected such that neither party can track the other without approval. To facilitate this interaction, the tracking device 106 is printed, engraved, etched, stamped, stickered, or otherwise marked with a smart code. The smart code may be a QR code, bar code, or other image that can be scanned or captured (for instance, by a camera or other mobile device). The smart code is embedded or encoded with a URL to a web page such that when the finder scans the smart code with a mobile device, the mobile device is directed to the web page for display by the mobile device. In some embodiments the tracking device is marked with plain text. The plain text is a string of numbers and/or letters that can be input to an online portal associated with the tracking device to direct the finder to a webpage for communication with the owner.

The web page may be configured or managed by the tracking system 100 and can display options for the finder to communicate with the owner. For example, the owner may have previously provided contact information to the tracking system 100 for the system to display to a finder in the event that the smart code on the owner's tracking device is scanned. In another example, the owner may not have provided information to the tracking system 100 in advance of the finder scanning the owner's device. In this embodiment, the web page may display an anonymous chat or call option for the finder to leave a message for the owner. The web page may also display a form for the finder to provide their contact information to the tracking system 100 so that the tracking system can present the information to the owner. The information displayed on the web page may be configurable by the owner to protect their privacy. An owner or finder may choose not to provide any contact information in order to preserve privacy. In such embodiments, the web page will be configured to facilitate anonymous contact between the owner and finder.

The owner may communicate their privacy preferences to the tracking system 100 via an application corresponding to the tracking system on their mobile device. The application also allows the owner to see the location of their tracking device. However, in order for a finder to notify the owner of a lost device, the finder is not required to have the application on their mobile device. The web page generated by the tracking system 100 upon the finder scanning the smart code enables communication between the finder and owner without the finder downloading the application corresponding to the tracking system 100.

In some embodiments, the owner can use the application associated with the tracking system 100 to indicate that their tracking device is lost. In these embodiments, communication with the owner or display of the owner's contact information on the web page may only be enabled if the owner has indicated their device is lost in advance of the smart code being scanned. If the owner has not indicated their device is lost and a finder scans the smart code, the tracking system 100 will notify the owner that their device has been scanned and allow the owner to indicate whether the device is lost. This notifies the owner each time their tracking device is scanned to alert them of potential unauthorized access by another person to their tracking device.

The tracking system receives 910 a tracking device identifier and a request for a web page to be created. The request and identifier are originated by a mobile device of a finder scanning or capturing an image of the smart code of the tracking device. The smart code is engraved or printed onto the tracking device and is embedded with a URL for the web page. When the finder navigates to the URL (e.g., via a web browser of the user's mobile device), the tracking system is sent a request to populate the web page with information specific to a tracking device identified in the request.

The tracking system provides 920 a web page configured to prompt a user (i.e. the finder) for a location of a mobile device, for instance via a web browser prompt that enables (via the web browser) a GPS receiver of the mobile device to capture a location of the mobile device. The location of the finder's mobile device at the time the smart code is scanned may be used by the tracking system 100 as a proxy location for the tracking device. The web page may also prompt the finder for their contact information or supply a text box in which the finder can write an anonymous message to the owner.

The tracking system associates 930 the location of the mobile device with the tracking device identifier received upon the finder scanning the tracking device. The tracking system can provide the location of the mobile device as a last known location of the tracking device to the owner of the tracking device. For instance, in response to the owner marking the tracking device as lost or requesting the last known location of the device a notification may be displayed on a device of the owner with the location of the finder's mobile device.

The tracking system generates 940 a notification indicating the tracking device was found by the user (i.e. the finder). This notification may ask the owner if the device is lost and if the owner indicates that the device is lost, can provide a form for the owner to input contact info the finder can use to contact them. An owner may choose to input no contact information to protect their privacy. In this case, the finder can communicate with the owner via an anonymous chat or call configured by the tracking system 100. For example, the tracking system 100 may provide a notification to the owner indicating that their tracking device has been scanned. This notification may include an anonymous message that the finder provided to the web page describing the location of the tracking device. The notification may comprise an automated call, automated text, or push notification sent to the mobile device of the owner.

The tracking system receives 950 information from the owner of the tracking device to establish communication with the user. The owner of the tracking device may provide their contact information to the tracking system before or after their tracking device is scanned. For example, the owner may configure their settings in the application associated with the tracking system 100 to provide certain default contact details in the case that their tracking device is scanned. The owner may also indicate to the tracking system that they would like to be asked to provide contact information each time their tracking device is scanned or asked for permission to display their information on the web page. The tracking system 100 establishes a form of communication between the finder and owner responsive to the information given by the owner.

The tracking system populates 960 the web page with the information from the owner to display to the user. As noted above, the tracking system can enable anonymous communication via messaging or phone call in order to facilitate the return of the tracking device to the owner.

Figure 10:
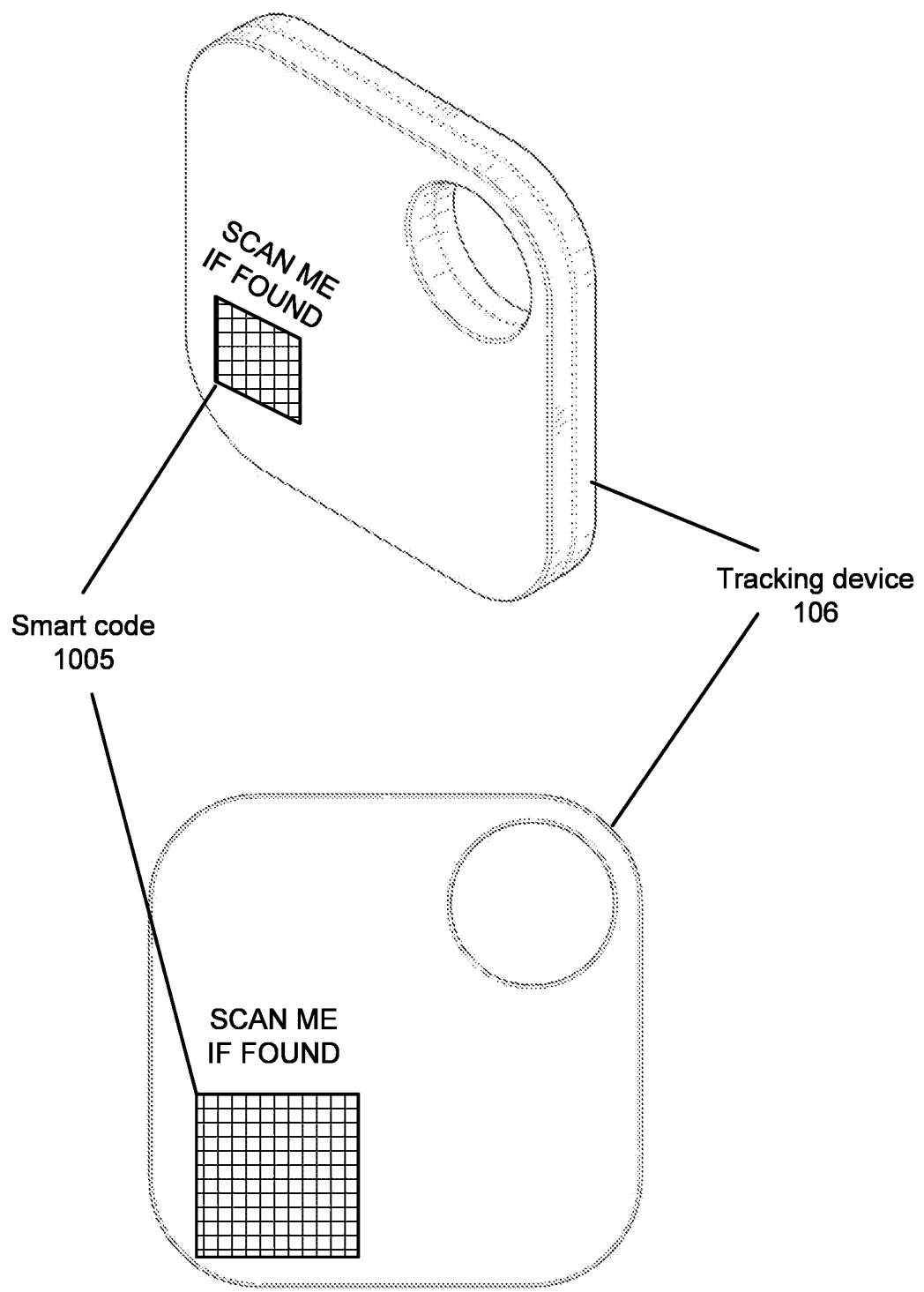
FIG. 10 illustrates a tracking device with a smart code, according to one embodiment.

FIG. 10 illustrates a tracking device with a smart code, according to one embodiment. In other embodiments, tracking devices and smart codes may take other forms or be of different sizes. For example, a tracking device may be a similar shape to a credit card. The tracking device 106 can be printed or engraved with a smart code 1005 having an embedded URL to a web page to enable the method 900 described above. The tracking device 106 may also be printed or engraved with a message instructing a finder to scan the code, such as the message "scan me if found" as seen in FIG. 10.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   receiving, by a tracking system, an identifier of a tracking device and a request for a web page from a mobile device that captures an image of a smart code included on an exterior of the tracking device, the smart code embedded with a URL for the web page;
   in response to the mobile device accessing the URL embedded within the smart code, generating, by the tracking system, and sending a notification to an owner of the tracking device indicating that the smart code was scanned and including an anonymous message entered by a user of the mobile device;
   providing, by the tracking system, the web page for display by the mobile device, the web page configured to prompt a user of the mobile device to provide, via a web browser of the mobile device, a location of the mobile device to the tracking system;
   receiving, by the tracking system, the location of the mobile device from the user; and
   in response to receiving the location of the mobile device, populating, by the tracking system, the web page with an interface element that enables the owner of the mobile device to establish an anonymous communication session with the owner of the tracking device.

2. The method of claim 1, wherein the mobile device does not have an application associated with the tracking system installed.

3. The method of claim 1, wherein the smart code is a QR code, bar code, or image.

4. The method of claim 1, wherein the web page enables the user of the mobile device to enable a GPS receiver of the mobile device.

5. The method of claim 1, wherein the web page includes a second interface element that enables the user of the mobile device to share the location of the mobile device with the owner of the tracking device.

6. The method of claim 1, wherein the anonymous communication session enables the user of the mobile device to identify a location at which the tracking device has been left by the user of the mobile device.

7. A non-transitory computer-readable storage medium storing executable instructions that, when executed by a hardware processor of a tracking system, cause the tracking system to perform steps comprising:
   receiving, by a tracking system, an identifier of a tracking device and a request for a web page from a mobile device that captures an image of a smart code included on an exterior of the tracking device, the smart code embedded with a URL for the web page;
   in response to the mobile device accessing the URL embedded within the smart code, generating, by the tracking system, and sending a notification to an owner of the tracking device indicating that the smart code was scanned and including an anonymous message entered by a user of the mobile device;
   providing, by the tracking system, the web page for display by the mobile device, the web page configured to prompt a user of the mobile device to provide, via a web browser of the mobile device, a location of the mobile device to the tracking system;
   receiving, by the tracking system, the location of the mobile device from the user; and
   in response to receiving the location of the mobile device, populating, by the tracking system, the web page with an interface element that enables the owner of the mobile device to establish an anonymous communication session with the owner of the tracking device.

8. The non-transitory computer-readable storage medium of claim 7, wherein the mobile device does not have an application associated with the tracking system installed.

9. The non-transitory computer-readable storage medium of claim 7, wherein the smart code is a QR code, bar code, or image.

10. The non-transitory computer-readable storage medium of claim 7, wherein the web page enables the user of the mobile device to enable a GPS receiver of the mobile device.

11. The non-transitory computer-readable storage medium of claim 7, wherein the web page includes a second interface element that enables the user of the mobile device to share the location of the mobile device with the owner of the tracking device.

12. The non-transitory computer-readable storage medium of claim 7, wherein the anonymous communication session enables the user of the mobile device to identify a location at which the tracking device has been left by the user of the mobile device.

13. A tracking system comprising a hardware processor and a non-transitory computer-readable storage medium storing executable instructions that, when executed by the hardware processor, cause the tracking system to perform steps comprising:
   receiving, by the tracking system, an identifier of a tracking device and a request for a web page from a mobile device that captures an image of a smart code included on an exterior of the tracking device, the smart code embedded with a URL for the web page;
   in response to the mobile device accessing the URL embedded within the smart code, generating, by the tracking system, and sending a notification to an owner of the tracking device indicating that the smart code was scanned and including an anonymous message entered by a user of the mobile device;
   providing, by the tracking system, the web page for display by the mobile device, the web page configured to prompt a user of the mobile device to provide, via a web browser of the mobile device, a location of the mobile device to the tracking system;
   receiving, by the tracking system, the location of the mobile device from the user; and
   in response to receiving the location of the mobile device, populating, by the tracking system, the web page with an interface element that enables the owner of the mobile device to establish an anonymous communication session with the owner of the tracking device.

14. The tracking system of claim 13, wherein the mobile device does not have an application associated with the tracking system installed.

15. The tracking system of claim 13, wherein the smart code is a QR code, bar code, or image.

16. The tracking system of claim 13, wherein the web page enables the user of the mobile device to enable a GPS receiver of the mobile device.

17. The tracking system of claim 13, wherein the web page includes a second interface element that enables the user of the mobile device to share the location of the mobile device with the owner of the tracking device.

18. The tracking system of claim 13, wherein the anonymous communication session enables the user of the mobile device to identify a location at which the tracking device has been left by the user of the mobile device.

* * * * *